(12) United States Patent
DeBoer et al.

(10) Patent No.: US 7,558,651 B2
(45) Date of Patent: Jul. 7, 2009

(54) DYNAMIC SETUP WIZARD IN LIGHTING CONTROL SYSTEM COMMISSIONING

(75) Inventors: John DeBoer, Decatur, GA (US); Seshagiri R Marellapudi, Norcross, GA (US); Ravikumar Balasubramaniam, Alpharetta, GA (US); Scott Knarich, Alpharetta, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 11/635,297

(22) Filed: Dec. 7, 2006

(65) Prior Publication Data

US 2008/0077280 A1 Mar. 27, 2008

Related U.S. Application Data

(60) Provisional application No. 60/826,587, filed on Sep. 22, 2006.

(51) Int. Cl.
  G05D 11/00 (2006.01)
(52) U.S. Cl. .................... 700/295; 700/297; 700/22
(58) Field of Classification Search ............. 700/286, 700/295, 297, 292, 22
  See application file for complete search history.

(56) References Cited

U.S. PATENT DOCUMENTS 6,985,784 B2 * 1/2006 Vandevanter et al. ........... 700/95
2002/0010518 A1 * 1/2002 Reid et al. .................... 700/31
2005/0090915 A1 * 4/2005 Geiwitz ........................ 700/90
2005/0125083 A1 * 6/2005 Kiko ............................ 700/19
2006/0052905 A1 * 3/2006 Pfingsten et al. ............ 700/286

* cited by examiner

*Primary Examiner*—Kidest Bahta
*Assistant Examiner*—Nathan Laughlin
(74) *Attorney, Agent, or Firm*—Jose de la Rosa

(57) ABSTRACT

A dynamically configurable electrical distribution system is provided for selectively connecting an electrical power source to load devices. The system comprises an electrical distribution panel and a plurality of switching devices mounted in the panel each electrically connected between an electrical power source and an associated load device for selectively delivering electrical power to the associated load device. A control system is mounted to the panel for controlling operation of the switching devices. The control system comprises a programmed controller for commanding operation of the switching devices. A memory stores configuration information relating to operation of the switching devices. The control system further comprises a user interface device. The program controller is programmed to implement a configuration routine enabling a user to define operation of the switching devices using the user interface. The configuration routine requests basic information to be entered by the user and responsive to the basic system information entered by the user automatically requests only detailed operation information required based on the entered basic system information.

15 Claims, 6 Drawing Sheets

DYNAMIC SETUP WIZARD IN LIGHTING CONTROL SYSTEM COMMISSIONING

CROSS REFERENCE TO RELATED APPLICATIONS

This application claims priority of provisional application No. 60/826,587 filed Sep. 22, 2006, the contents of which is incorporated by reference herein.

FIELD OF THE INVENTION

This invention relates generally to residential and commercial electrical power distribution panels and components, and more particularly, to a system and method for dynamically configuring operation of the power distribution panel during commissioning.

BACKGROUND OF THE INVENTION

Circuit breaker panels are used to protect electrical circuitry from damage due to an overcurrent condition, such as an overload, a relatively high level short circuit, or a ground fault condition. To perform that function, circuit breaker panels include circuit breakers that typically contain a switch unit and a trip unit. The switch unit is coupled to the electrical circuitry (i.e., lines and loads) such that it can open or close the electrical path of the electrical circuitry. The switch unit includes a pair of separable contacts per phase, a pivoting contact arm per phase, an operating mechanism, and an operating handle.

In the overcurrent condition, all the pairs of separable contacts are disengaged or tripped, opening the electrical circuitry. When the overcurrent condition is no longer present, the circuit breaker can be reset such that all the pairs of separable contacts are engaged, closing the electrical circuitry.

In addition to manual overcurrent protection via the operating handle, automatic overcurrent protection is also provided via the trip unit. The trip unit, coupled to the switch unit, senses the electrical circuitry for the overcurrent condition and automatically trips the circuit breaker. When the overcurrent condition is sensed, a tripping mechanism included in the trip unit actuates the operating mechanism, thereby disengaging the first contact from the second contact for each phase. Typically, the operating handle is coupled to the operating mechanism such that when the tripping mechanism actuates the operating mechanism to separate the contacts, the operating handle also moves to a tripped position.

Switchgear and switchboard are general terms used to refer to electrical equipment including metal enclosures that house switching and interrupting devices such as fuses, circuit breakers and relays, along with associated control, instrumentation and metering devices. The enclosures also typically include devices such as bus bars, inner connections and supporting structures (referred to generally herein as "panels") used for the distribution of electrical power. Such electrical equipment can be maintained in a building such as a factory or commercial establishment, or it can be maintained outside of such facilities and exposed to environmental weather conditions. Typically, hinge doors or covers are provided on the front of the switchgear or switchboard sections for access to the devices contained therein.

In addition to electrical distribution and the protection of circuitry from overcurrent conditions, components have been added to panels for the control of electrical power to loads connected to circuit breakers. For example, components have been used to control electrical power for lighting.

One system used for controlling electrical power to loads utilizes a remote-operated circuit breaker system. In such a system, the switch unit of the circuit breaker operates not only in response to an overcurrent condition, but also in response to a signal received from a control unit separate from the circuit breaker. The circuit breaker is specially constructed for use as a remote-operated circuit breaker, and contains a motor for actuating the switch unit.

In an exemplary remote-operated circuit breaker system, a control unit is installed on the panel and is hard-wired to the remote-operated circuit breaker through a control bus. When the switch unit of the circuit breaker is to be closed or opened, an operating current is applied to or removed from the circuit breaker motor directly by the control panel. Additional, separate conductors are provided in the bus for feedback information such as contact confirmation, etc., for each circuit breaker position in the panel. The control unit contains electronics for separately applying and removing the operating current to the circuit breakers installed in particular circuit breaker positions in the panel. The panel control unit also has electronics for checking the state of the circuit breaker, diagnostics, etc. One advantage of that system is that the individual circuit breakers can be addressed according to their positions in the panel.

Such known remote-operated circuit breaker systems require a user to configure operation, such as programming on and off times and the like. The complexity of the desired operation may prove problematic and time consuming for a user to perform set up procedures. For example, the user must understand complex set up procedures and often configure each switch unit individually. While reference manuals may provide instruction for performing configuration, users tend to avoid use of such manuals. This may result in substantial time spent configuring the system, particularly when it is desired to have features such as common control, use of remote input, individualized scheduling, and the like.

The present invention is directed to improvements in configuring electrical distribution systems.

SUMMARY OF THE INVENTION

In accordance with the invention, there is provided a dynamic setup system and method in an electrical distribution system.

There is disclosed in accordance with one aspect of the invention a dynamically configurable electrical distribution system for selectively connecting an electrical power source to load devices. The system comprises an electrical distribution panel and a plurality of switching devices mounted in the panel each electrically connected between an electrical power source and an associated load device for selectively delivering electrical power to the associated load device. A control system is mounted to the panel for controlling operation of the switching devices. The control system comprises a programmed controller for commanding operation of the switching devices. A memory stores configuration information relating to operation of the switching devices. The control system further comprises a user interface device. The program controller is programmed to implement a configuration routine enabling a user to define operation of the switching devices using the user interface. The configuration routine requests basic information to be entered by the user and responsive to the basic system information entered by the user automatically requests only detailed operation information required based on the entered basic system information.

It is a feature of the invention that the basic information is selected from a group including panel, breakers, inputs, zones, mapping and schedules.

It is another feature of the invention that the user interface device comprises a touch screen display used by the user to enter configuration information.

It is still another feature of the invention that the configuration routine generates a series of setup screens to be displayed on the touch screen display.

It is still a further feature of the invention that the information requested on each setup screen is dynamically updated based on previous information entered by the user.

In accordance with another aspect of the invention, a dynamically configurable electrical distribution system further comprises a plurality of electrical distribution panels with a plurality of switching devices mounted in each panel. The control system is mounted to one of the plurality of panels.

There is disclosed in accordance with another aspect of the invention the method for dynamically configuring an electrical distribution system used for selectively connecting an electrical power source to load devices, comprising: providing at least one electrical distribution panel; providing a plurality of switching devices mounted in the panel or panels each electrically connected between an electrical power source and a load device for selectively delivering electrical power to the load device; providing a programmed controller for commanding operation of the switching devices in accordance with a scheduling routine and configuration information stored in a memory; and operating a user interface of the programmed controller to enter the configuration information using a configuration routine enabling a user to define operation of the switching devices using the user interface, the configuration routine requesting basic system information to be entered by the user and responsive to basic system information entered by the user automatically requesting only detailed operation information required based on the entered basic system information.

Further features and advantages of the invention will be readily apparent from the specification and from the drawings.

DETAILED DESCRIPTION OF THE INVENTION

An electrical distribution system, such as an integrated lighting control system, in accordance with the invention permits a user to control power circuits typically used for lighting, as well as circuits for resistive heating or air conditioning, and configure the system using a dynamic setup wizard. Control may include on/off switching, dimming and metering. The electrical distribution system may be as is generally described in U.S. application Ser. No. 11/519,727, filed Sep. 12, 2006, the specification of which is incorporated by reference herein.

Figure 1:
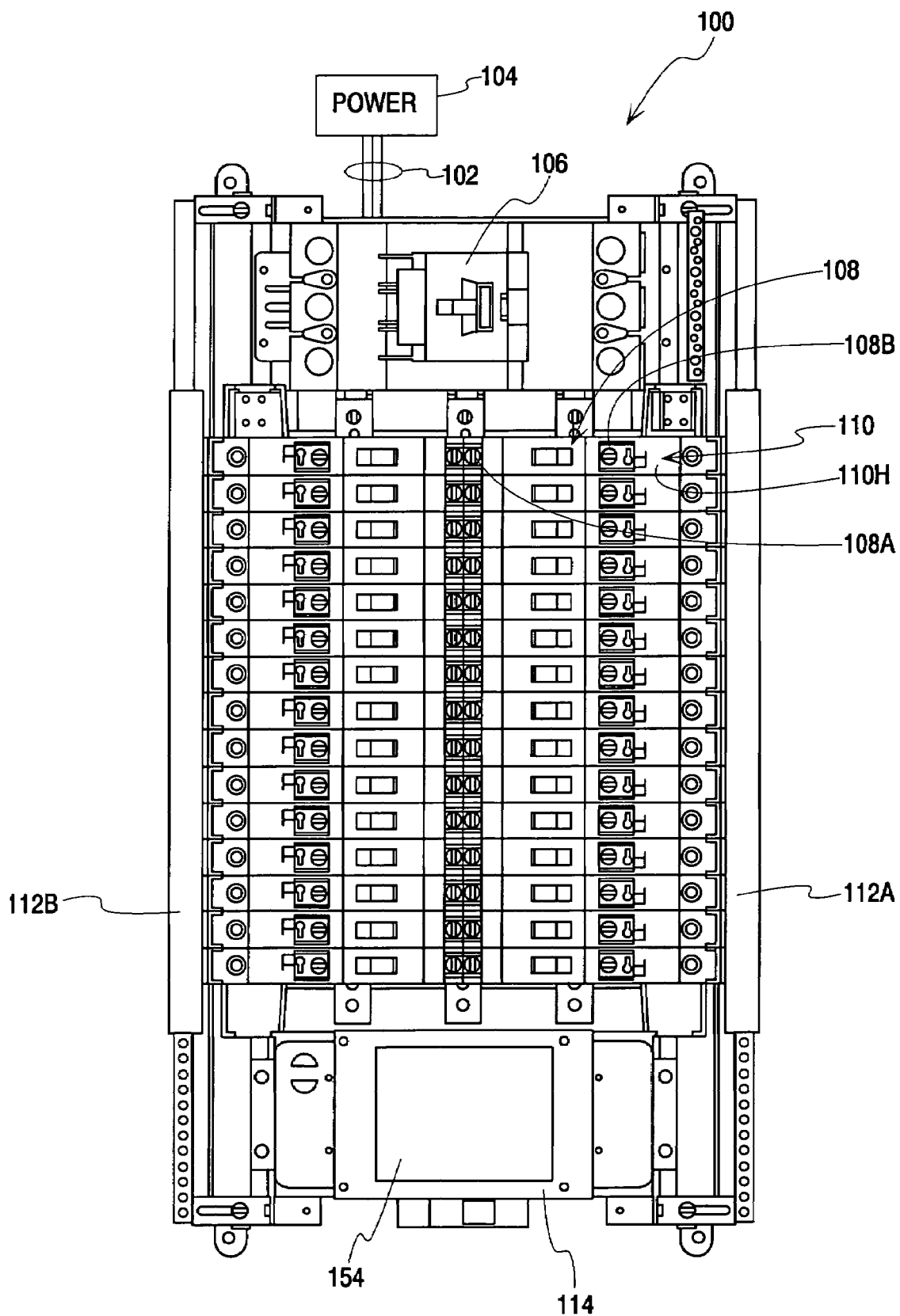
FIG. 1 is an elevation view of a power distribution panel according to the invention.

Referring to FIG. 1, a lighting control system in accordance with the invention comprises a lighting control panel 100. The panel 100 may comprise a Siemens type P1 panelboard, although the invention is not limited to such a configuration. Line power enters the panel 100 through power source cables 102 connected to a source of power 104. Line power may, for example, be a three phase 480Y277, 240 or 120 VAC power source, as is conventional. The cables 102 are electrically connected to an input side of a main breaker 106. The main breaker 106 distributes line power to individual circuit breakers 108 in a conventional manner. How the power is distributed depends on design of the individual circuit breakers 108, as will be apparent to those skilled in the art. The power is distributed to the line side of individual circuit breakers 108. The panel 100 may be configured to accept up to forty two individual circuit breakers 108, although only thirty are shown in the embodiment of FIG. 1. Each circuit breaker may be of conventional construction and may be, for example, a Siemens BQD circuit breaker. Each circuit breaker 108 includes a line lug or terminal 108A receiving power from the main breaker 106 and a load lug or terminal 108B conventionally used for connecting to a load circuit.

For simplicity of description, when a device such as a circuit breaker 108 is described generally herein the device is referenced without any hyphenated suffix. Conversely, if a specific one of the devices is described it is referenced with a hyphenated suffix, such as 108-1.

In accordance with the invention, each load circuit to be controlled also has a remote operated device 110, such as a relay, a meter or a dimmer. The term remote operated device as used herein includes any other devices that controls, monitors or may otherwise be used in a load circuit, in accordance with the invention. While in a preferred embodiment, the remote operated device 110 is a separate component from the circuit breaker 108, the term "remote operated device" as used herein encompasses devices integral with the circuit breaker. The remote operated devices 110 are also connected to data rails 112A and 112B. A panel controller 114 controls the remote operated devices 110 through connections provided via the data rails 112A and 112B, as discussed below.

The remote operated device 110 includes a housing 110H encasing an auxiliary set of contacts that can be remotely operated to open and close a lighting circuit. The device 110 is attached to the load side of a circuit breaker 108 within a panel 100 using a conductor tab, i.e., the terminal 110A, inserted into the breaker lug 108B. The load terminal 110B comprises a lug os the same size as the breaker lug 108B for connecting to a wire to be connected to the load device. The device housing 110H is configured to mount in a Siemens type P1 panelboard, although the invention is not limited to such a configuration.

Figure 2:
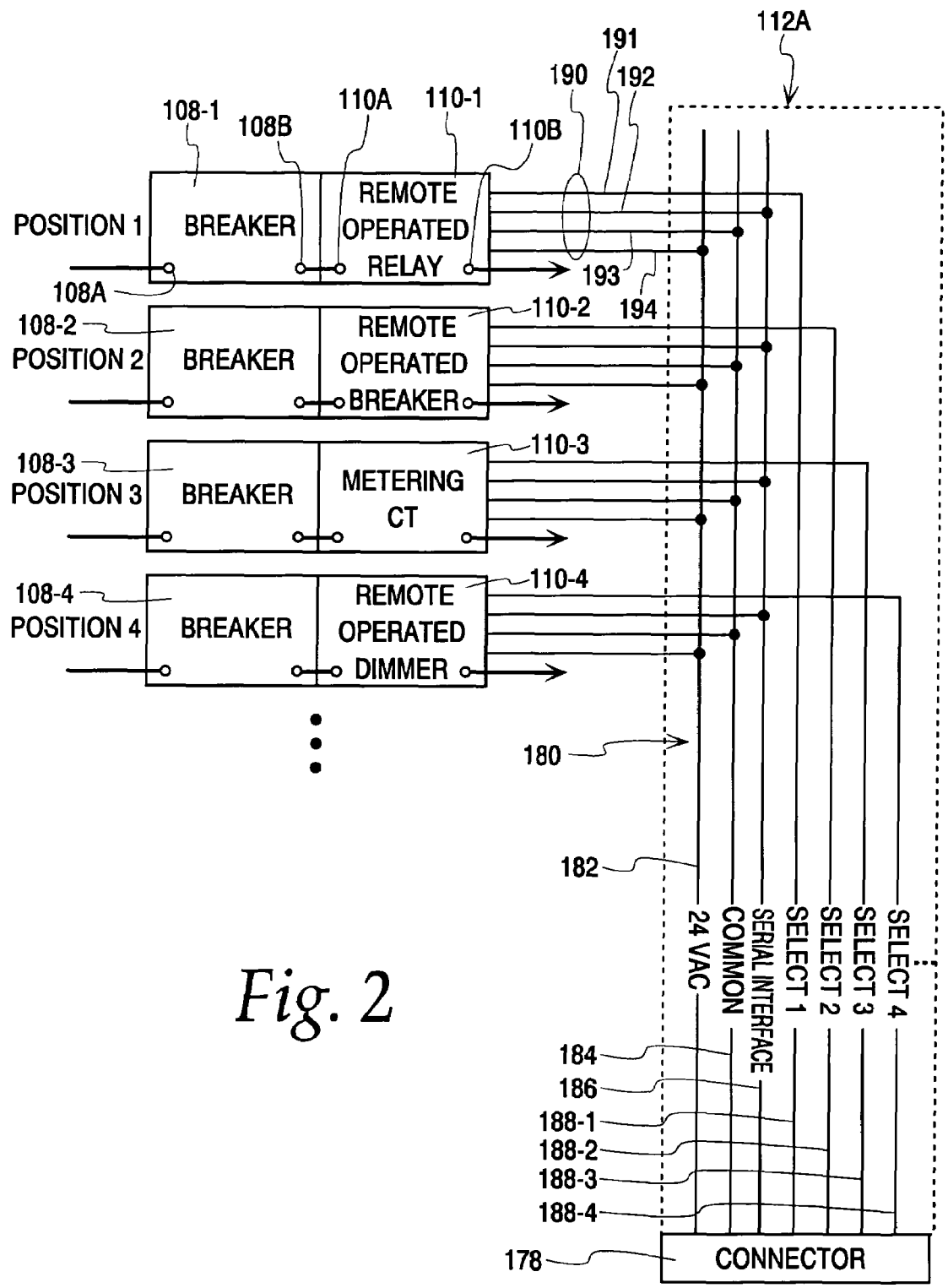
FIG. 2 is a block diagram illustrating pairs of circuit breakers and remote operated devices of the power distribution panel of FIG. 1.

Referring to FIG. 2, a block diagram illustrates four circuit breakers 108-1, 108-2, 108-3 and 108-4, and respective associated remote operated devices 110-1, 110-2, 110-3 and 110-4. In the illustrated embodiment, the first device 110-1 comprises a relay, the second device 110-2 comprises a breaker, the third device 110-3 comprises a current transformer, and the fourth device 110-4 comprises a dimmer. As is apparent, any combination of these remote operated devices 110 could be used. Each remote operated device 110 includes an input terminal 110A electrically connected to the associated circuit breaker load terminal 108B, and an output terminal 110B for connection to a load device.

Figure 3:
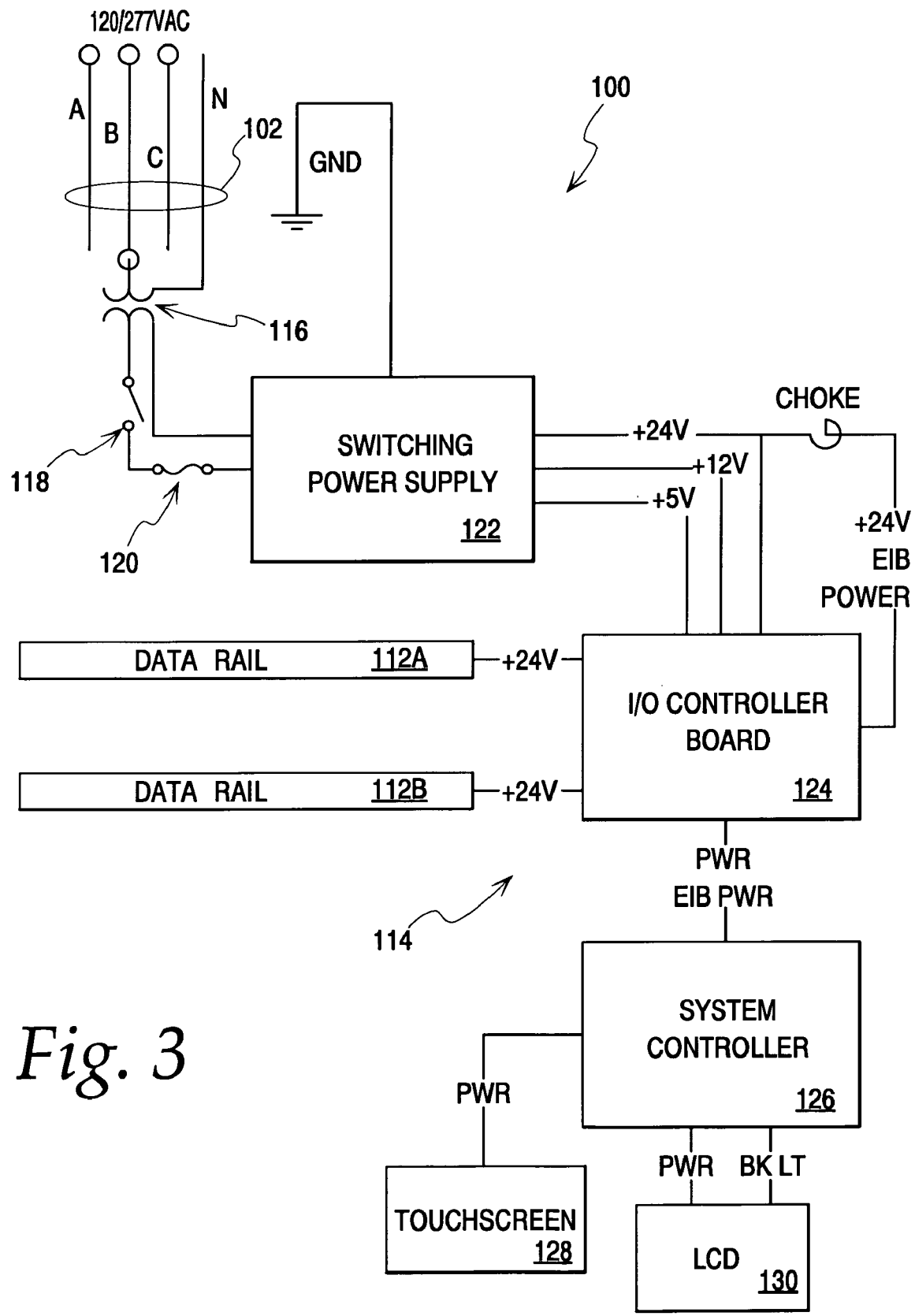
FIG. 3 is a block diagram of the power distribution panel of FIG. 1.

Referring to FIG. 3, a block diagram of the lighting control panel 100 is illustrated. Power from the lines 102 is provided via an isolation transformer 116, power switch 118 and fuse 120 to a switching power supply 122. The panel controller 114 comprises an input/output (I/O) controller 124 and optionally a system controller 126. While the I/O controller 124 and the system controller 126 are described as separate elements, the functionality can be combined into a single controller, as will be apparent. The power supply 122 provides isolated power to all of the control components including the I/O controller 124, the system controller 126, and the remote operated devices 110, see FIG. 1, via the data rails 112A and 112B. The I/O controller 124 and system controller 126 each have DC-DC converters deriving regulated DC voltage levels as required from the main DC output of the power supply 122. The power supply 122 also provides 24 volts to the remote operated devices 110. The system controller 126 is operatively connected to a touch screen 128 and an LCD 130.

Figure 4:
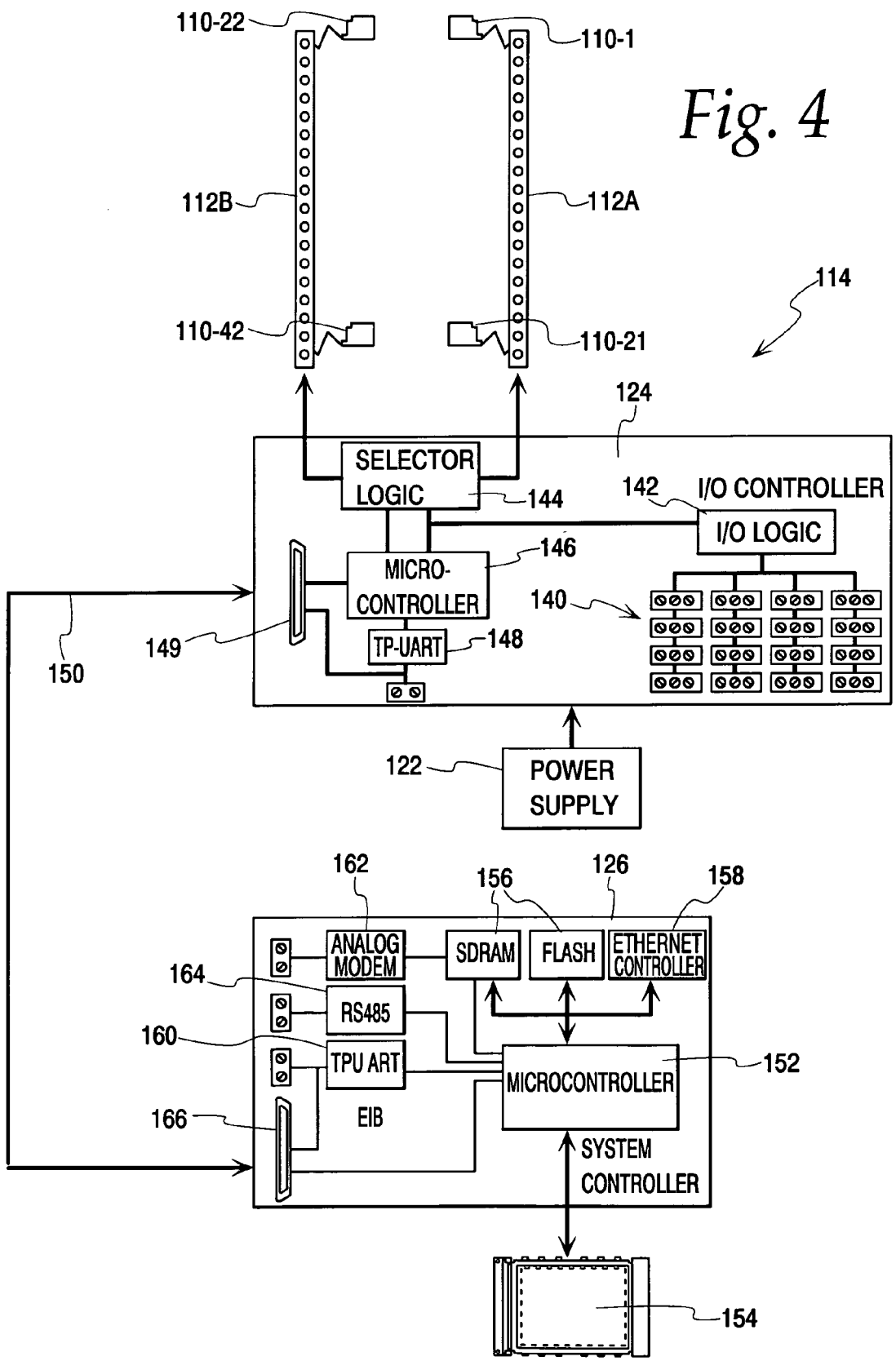
FIG. 4 is an expanded schematic/block diagram of the power distribution panel of FIG. 1.

In one embodiment of the invention, shown in FIG. 4, the panel controller 114 functions as a single panel stand alone system. The I/O controller 124 supplies power and control signals through the rails 112A and 112B to the remote operated devices, four of which, 110-1, 110-21, 110-22 and 110-42, are illustrated. A user interface and high level scheduling and control are provided by the system controller 126.

The I/O controller 124 provides discrete inputs to the controller 114 from dry contact switches, such as wall switches, (not shown) which can be connected to discrete input terminals 140. The terminals 140 are organized as two inputs and a common. The inputs to the terminals 140 are detected by dry contact I/O logic 142. A selector logic block 144 generates selector line signals and serial communications to the remote operated devices 110 via the data rails 112. The logic blocks 142 and 144 are operatively associated with a microprocessor or microcontroller 146. A TP-UART integrated circuit 148 provides an EIB (European Installation Bus) interface. A connector 149 allows mating directly to the system controller 126 via a cable 150.

The system controller 126 provides the user with an application to implement lighting schedules, organize devices into logical groups, manage the inputs, and obtain status information. The system controller 126 includes a microprocessor 152 operatively connected to a user interface 154 in the form of an integrated touch screen 128 and LCD 130, see FIG. 3. The microprocessor 152 is also connected to memory devices 156 and an ethernet controller 158. A TP-UART circuit 160 provides an EIB interface while additional interfaces are provided via an analog modem 162 and RS 485 interface circuit 164. A connector 162 is provided for connection to the cable 150 to transfer information between the system controller 126 and the I/O controller 124.

Figure 5:
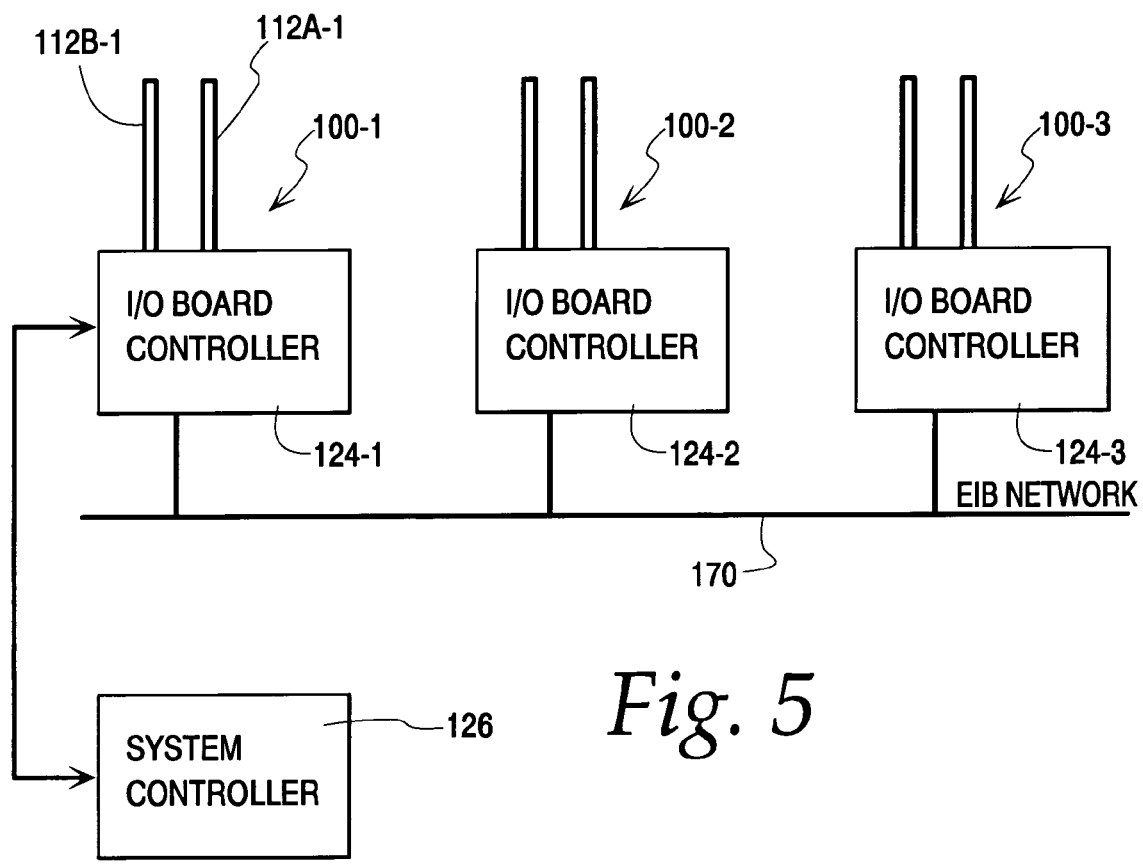
FIG. 5 is a block diagram of a power distribution system according to an alternative embodiment of the invention.

In another embodiment, shown in FIG. 5, multiple lighting control panels 100-1, 100-2 and 100-3 are configured to work as a single unit with the first panel 100-1 being configured as a master, and the other panels 100-2 and 100-3 configured as slaves. To configure the first panel 100-1 as a master, the system controller 126 is used. The slave panels 100-2 and 100-3 contain no system controller. Instead, an EIB bus 170 interconnects the I/O controller boards 124-1, 124-2 and 124-3. Overall control for each of the panels is directed by the system controller 126.

Referring again to FIG. 2, a data rail 112 is illustrated schematically. The data rail 112 is mechanically attached directly to the interior of the lighting control panel 100. The data rail 112 comprises a shielded communication bus including a ribbon connector 178 having twenty-five to twenty-nine wires to be routed to the I/O controller 124. The ribbon connector 178 typically has twenty-six wires, two for power connection, two for ground connection, one for the serial line and up to twenty-one select lines, one for each remote operated device 110. Each data rail 112 provides a barrier to isolate the class 1 load wires from the class 2 signal wires used to manage the devices 110. The data rails 112 will connect to each device 110 via a connector that extends out of the device 110. The wires are connected to lines in the form of traces on a printed circuit board 180. A power trace 182 provides 24 volt DC power to each remote operated device 110. A common trace 184 provides a ground to each remote operated device 110. A serial interface trace 186 provides serial communication to each of the remote operated devices 110. A plurality of select line traces, four of which 188-1, 188-2, 188-3 and 188-4 are illustrated, are provided, one for each remote operated device 110. Each remote operated device 110 includes a four wire cable 190 for connection to the data rail 112. The four wires comprise a select line 191 connected to one of the select traces 188, a serial interface line 192 connected to the serial interface trace 186, a neutral wire 193 connected to the common trace 184 and a power wire 194 connected to the power trace 182.

In accordance with the invention, a unique select line is assigned to each breaker 108/remote operated device 110 pair positioned within the lighting control panel 100. Select lines are used by the I/O controller 124 to select single remote operated devices 110 to communicate via the serial interface 186 at any given time. For example, when the first select line 188-1 is asserted, the first remote operated device 110-1 listens for messages on the serial interface line 186. Conversely, messages on the serial interface line 186 are ignored if the first select line 188-1 is not asserted. A response by any of the remote operated devices 110 to a serial command is therefore conditional on whether its particular select line is asserted. The term "asserted", as used herein, means one state of a signal designated to cause the remote operated device to listen for messages. In a preferred embodiment, the select line has "high" and "low" states, the high state being the asserted state.

The remote operated device 110, in the form of a relay, allows remote switching of an electrical branch load. The device 110 is designed to fit inside a standard electrical panel board with up to forty-two branch circuit breakers 108. The device 110 is an accessory to a branch circuit breaker 108 allowing repetitive switching of the load without effecting operation of the circuit breaker 108.

The remote operator device 110 requires a means to receive command signals to open or close and to report back successful operation or device status. Also required is a means to drive opening and closing of the switch mechanism contacts. In accordance with the invention, the remote operated device uses two magnetically held solenoids as an actuator device and one electronic circuit board similar to a single pole device. With this design, electronic control circuitry is located inside the switching device itself. Only one circuit is needed to operate both actuators. The use of two magnetically held solenoids or "mag latches" as switching actuators results in very low energy requirements, requires short duration pulses to change position (measured in milliseconds), provides accurate and repeatable timing and requires that the control must reverse voltage polarity.

Figure 6:
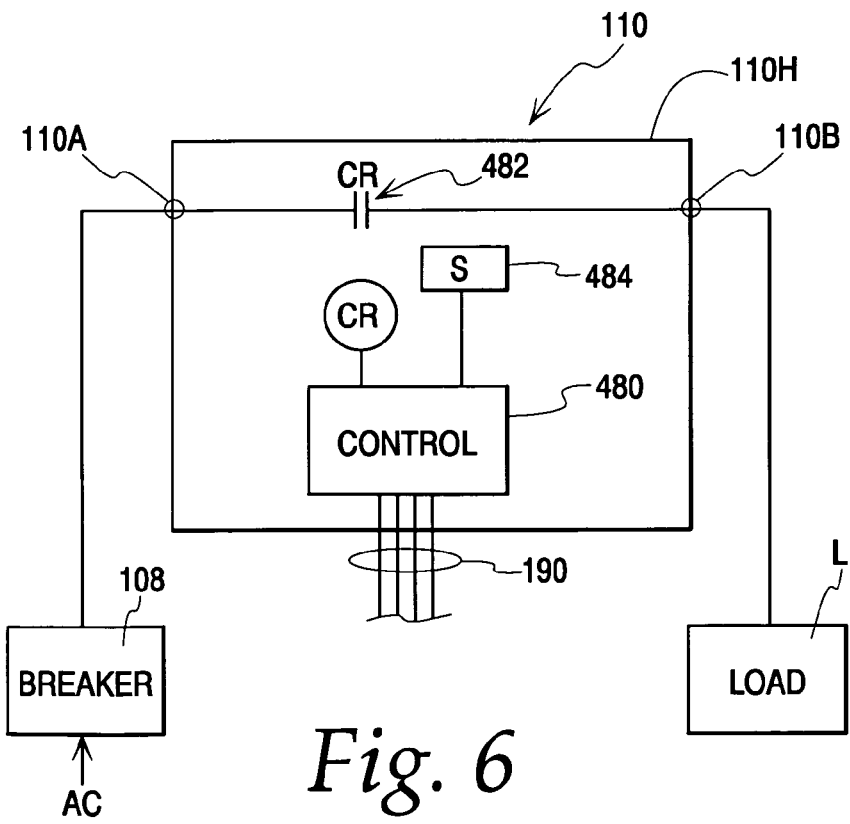
FIG. 6 is a block diagram of a remote operated device according to the invention.

FIG. 6 illustrates a basic block diagram for load switching. The remote operated device 110, in the form of a relay, includes a control circuit 480 connected to the cable 190. The control circuit 480 drives a control relay CR having a normally open contact 482 connected between the terminals 110A and 110B. A sensor 484 senses status of the relay CR and is connected to the control circuit 480. As such, the control circuit 480 controls operation of the contact 482 to selectively electrically connect a load L to the breaker 108, and thus to power the load L.

The control circuit 480 comprises a conventional microcontroller and associated memory, the memory storing software to run in the control circuit 480 in accordance with commands received from the I/O controller 124.

The software implemented in the remote operator device control circuit 480 includes various routines. This includes a start up routine executed when the control circuit 480 resets. It reads any data that has been stored in memory that needs to be modified during operations into ram variables. It turns out interrupts and otherwise initialize microcontroller operations and jumps into a status loop function.

The status loop function has several objectives. One is to keep the status data up to date to respond to status requests. Another is to run the state machine for the device, such as managing pulse widths and sequencing retry.

Pulse widths for open and close are not the same. Also, the pulse width for the open operation is not always the same, it increases by temperature/age/ number of times closed. An open contacts function will set up the sequencer for an open operation placing a start open pulse task and a stop open pulse task into a sequence or queue. The open command is always executed, regardless of the detected position of the contacts, to overcome any failures in detecting the position of the contacts. A close contacts function sets up a sequencer for a close operation replacing a start close pulse task and a stop close pulse task into the sequencer queue. The close command will always be executed, regardless of the detected position, to overcome any failures in detecting the position of the contacts.

A communications handler function runs communications protocol over the serial line. The functions include decode command, open, close, send status and send report. A report operation function assembles the data required to respond to a report operation command received on the serial line.

Communications from the I/O controller 124 to the remote operated device 110 will be master-slave, with the I/O controller 124 being the master and the devices 110 the slaves. Once the I/O controller application sends an open or closed command, it will not wait for a response from the device 110. Rather, it hands over to the I/O sequencer queue, to perform a status check at a later time. This allows some time for the device 110 to settle down with its new status.

In the case of sending open or closed commands to more than one device 110 at the same time, one open command does the job after the I/O controller 124 enables the respective device select lines. For example, the I/O controller 124 might turn on the select line for devices 110-4, 110-7, 110-9, then send out one open command. Devices 110-4, 110-7 and 110-9 would all see the open command and attempt to open the mag latch.

In accordance with the invention, the system controller 126 provides a user interface application via the touch panel user interface 154 for the user to configure the system. This configuration includes setting up panels, breakers, zones, inputs, I/O mappings, schedules and overrides.

To implement the user interface application, the user needs to answer a set of questions and based on the responses required screens are created dynamically and displayed to the user in a step by step process.

A lighting control panel 100 may include up to forty-two circuit breakers 108, and associated remote operated devices 110, thirty-two digital inputs and two analog inputs. Each control panel 100 includes an I/O controller 124. A system controller 126 inside one of the panels 100 can control up to seven additional panels, for a total of eight, each having an I/O controller 124, three of which are shown in FIG. 5. The system controller user interface 154 is used to configure various features of these panels 100.

The main configuration features include setting up panels, setting up breakers, setting up inputs, setting up zones, setting input to output mappings and setting up schedules. The complexity of some of these features demand that a particular item can be properly set up only if a different item has already been set up. In accordance with the invention, a dynamic setup wizard routine is used. The number of steps or the number of screens is always dependent on responses to the questions user gives in the preliminary input screen, and subsequent screens.

Figure 7:
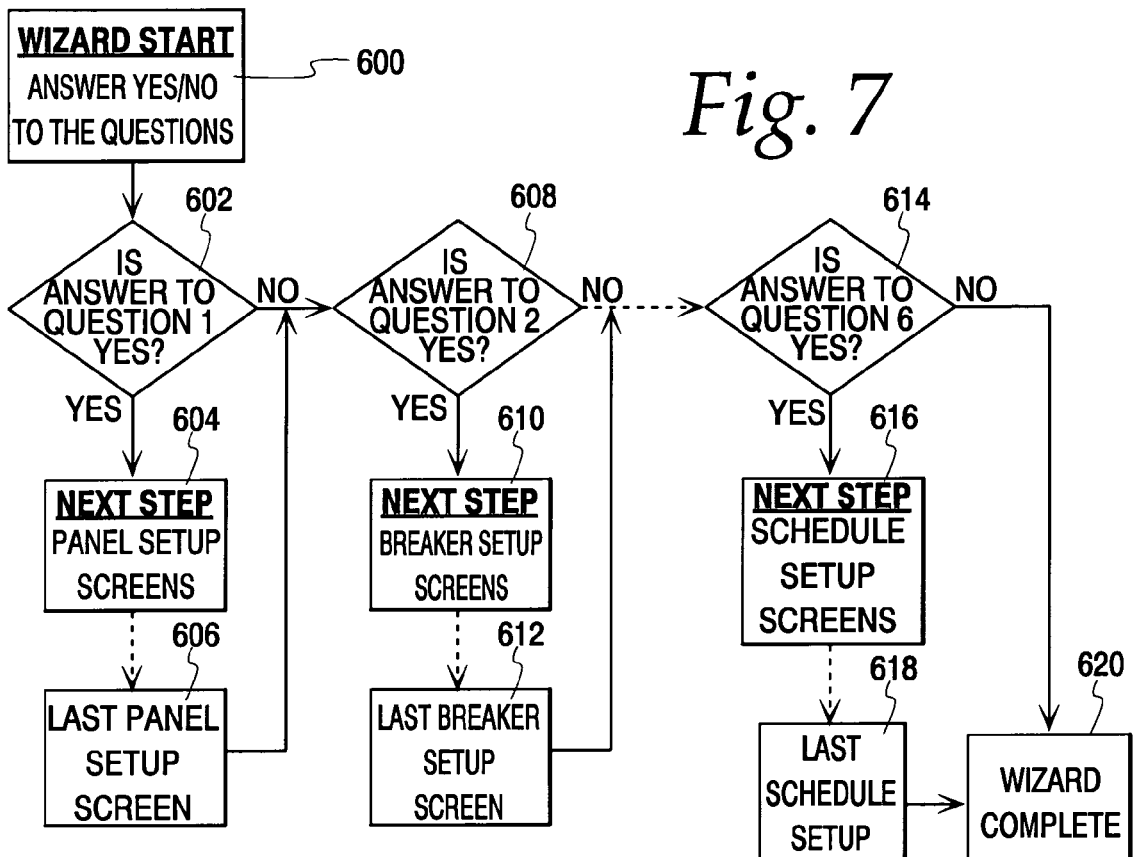
FIG. 7 is a flow diagram of a dynamic setup wizard routine implemented in the system controller of FIG. 4.
Figure 8:
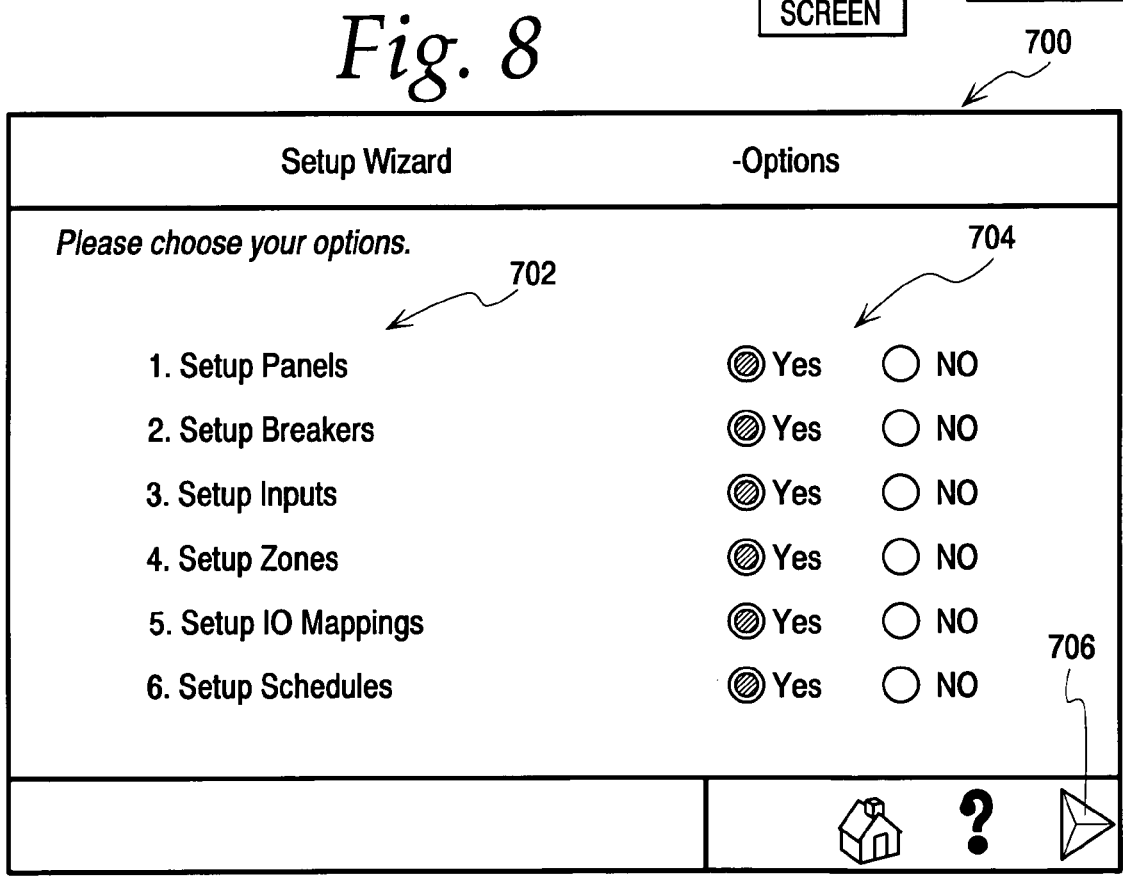
FIG. 8 is user interface screen used in connection with the dynamic setup wizard routine of FIG. 6.

FIG. 7 is a flow diagram of a dynamic setup wizard routine implemented in the system controller 126, see FIG. 4. FIG. 8 is a user interface screen displayed on the display screen 130 during configuration.

The configuration routine begins at a block 600 where the user is instructed to answer yes or no to six preliminary questions, as illustrated on the display screen 700 of FIG. 8. The six questions are shown in a first column which includes the following:

1. Setup panels
2. Setup breakers
3. Setup inputs
4. Setup zones
5. Setup I/O mappings
6. Setup schedules For each option, the user can select Yes or No at a display location 704. Once the user has answered all of the questions, then the user presses an arrow 706 for the configuration routine to continue.

Referring again to FIG. 7, a decision block 602 determines if the answer to question 1, Setup Panels, is Yes. In one embodiment of the invention the user may be required to select yes to the Setup Panels option. The user will access the Setup Panels option during initial configuration or to make changes. If the user selects yes, then a panel setup screen for a first panel is displayed at a block 604. The panel setup screen enables the user to indicate for each of up to eight panels whether or not a panel is present and provide identifying information for the panels. This continues until the user has accessed the last panel setup screen at a block 606. Thereafter, or if the answer to question 1 was No, then a decision block 608 determines if the answer to question 2, Setup Breakers, was Yes. If so, then the routine continues to a block 610 which shows a breaker setup screen. A breaker setup screen would be shown for each panel that has been previously set up. For example, if only two panels have been set up, then only breaker screens for the two panels will be shown. The user can then identify the locations in each panel of a circuit breaker 108 and/or a remote operated device 110. This process continues until the user has accessed the last breaker setup screen at a block 612.

Thereafter, or if the answer to question 2 is No, then the configuration routine will continue similarly for the remaining options 3, 4 and 5. For example, the user can set up the thirty-two digital inputs and two analog inputs for each previously identified panel, if the user has chosen the Setup Inputs option. Next, if the user has requested the Setup Zones option, then the user will be provided with a series of screens allowing the user to identify zones each including a plurality of the remote operated devices. For example, it may be desirable to use zone control to control multiple remote operated devices 110 simultaneously. By setting up the zone, the user need only define a particular schedule requirement for a zone, or identify an input device associated with a particular zone. Next, the user can set up I/O mappings by identifying what inputs should be associated with which outputs, i.e., specific individual remote operated devices 110, or zones of remote operated devices.

Finally, a decision block 614 determines if the answer to question 6, Setup Schedules, is Yes. If so, then a block 616 displays a first schedule set up screen enabling a user to configure a schedule for each remote operated device and/or zone, or the like. In accordance with the invention, the schedule guides the user so that it is only necessary to provide scheduling for panels which have been previously been configured and breaker locations which have previously been configured. This continues until the last scheduled set up screen has been completed at a block 618. Thereafter, or if the answer to question 6 was No, then the wizard is completed at a block 620.

Thus, in accordance with the invention, the set up wizard dynamically creates only the required display screens to display to the user in a step by step setup process.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

We claim:

1. A dynamically configurable electrical distribution system for selectively connecting an electrical power source to load devices, comprising:
    an electrical distribution panel;
    a plurality of switching devices mounted in the panel each electrically connected between an electrical power source and an associated load device for selectively delivering electrical power to the associated load device;
    a control system mounted to the panel for controlling operation of the switching devices, the control system comprising a programmed controller for commanding operation of the switching devices, a memory storing configuration information relating to operation of the switching devices, and a user interface device, the programmed controller programmed to implement a configuration routine enabling a user to define operation of the switching devices using the user interface, the configuration routine requesting basic system information to be entered by the user, the basic system information comprising actual locations and types of switching devices in the panel, and responsive to basic system information entered by the user automatically requesting only detailed operation information required based on the entered basic system information, the detailed operation information comprising identifying zones of operation for a select plurality of the actual locations of the switching devices and selecting operating schedules for only the identified zones and/or individual actual locations of the switching devices.

2. The dynamically configurable electrical distribution system of claim 1 wherein the basic information further comprise input types and input/output mapping.

3. The dynamically configurable electrical distribution system of claim 1 wherein the user interface device comprises a touch screen display used by the user interface to enter configuration information.

4. The dynamically configurable electrical distribution system of claim 3 wherein the configuration routine generates a series of setup screens to be displayed on the touch screen display.

5. The dynamically configurable electrical distribution system of claim 4 wherein information requested on each setup screen is dynamically updated based on previous information entered by the user.

6. A dynamically configurable electrical distribution system for selectively connecting an electrical power source to load devices, comprising:
    a plurality of electrical distribution panels;
    a plurality of switching devices mounted in each panel, each switching device to be electrically connected between an electrical power source and an associated load device for selectively delivering electrical power to the associated load device;
    a control system mounted to one of the plurality of panels for controlling operation of the switching devices, the control system comprising a programmed controller for commanding operation of the switching devices, a memory storing configuration information relating to operation of the switching devices, and a user interface device, the programmed controller programmed to implement a configuration routine enabling a user to define operation of the switching devices using the user interface, the configuration routine requesting basic system information to be entered by the user, the basic system information comprising identifying information for each of the plurality of electrical distribution panels and actual locations and types of switching devices in each panel, and responsive to basic system information entered by the user automatically requesting only detailed operation information required based on the entered basic system information, the detailed operation information comprising identifying zones of operation for a select plurality of the actual locations of the switching devices and selecting operating schedules for only the identified zones and/or individual actual locations of the switching devices.

7. The dynamically configurable electrical distribution system of claim 6 wherein the basic information further comprise input types and input/output mapping.

8. The dynamically configurable electrical distribution system of claim 6 wherein the user interface device comprises a touch screen display used by the user interface to enter configuration information.

9. The dynamically configurable electrical distribution system of claim 8 wherein the configuration routine generates a series of setup screens to be displayed on the touch screen display.

10. The dynamically configurable electrical distribution system of claim 9 wherein information requested on each setup screen is dynamically updated based on previous information entered by the user.

11. The method for dynamically configuring an electrical distribution system used for selectively connecting an electrical power source to load devices, comprising:

provantage at least one electrical distribution panel;

providing a plurality of switching devices mounted in the panel or panels each electrically connected between an electrical power source and a load device for selectively delivering electrical power to the load device;

providing a programmed controller for commanding operation of the switching devices in accordance with a scheduling routine and configuration information stored in a memory; and operating a user interface of the programmed controller to enter the configuration information using a configuration routine enabling a user to define operation of the switching devices using the user interface, the configuration routine requesting basic system information to be entered by the user, the basic system information comprising actual locations and types of switching devices in the panel, and responsive to basic system information entered by the user automatically requesting only detailed operation information required based on the entered basic system information, the detailed operation information comprising identifying zones of operation for a select plurality of the actual locations of the switching devices and selecting operating schedules for only the identified zones and/or individual actual locations of the switching devices.

12. The method of claim 11 wherein the basic information further comprise input types and input/output mapping.

13. The method of claim 11 wherein the user interface comprises a display screen and requesting basic system information to be entered by the user comprises generating a screen display listing options to be selected by the user.

14. The method of claim 13 wherein the configuration routine generates a series of setup screens to be displayed on the screen display.

15. The method of claim 14 wherein information requested on each setup screen is dynamically updated based on previous information entered by the user.

* * * * *